Nov. 17, 1970     G. L. EBBE     3,540,223
IRRIGATION SYSTEMS AND CONNECTORS THEREFOR
Filed Jan. 10, 1968
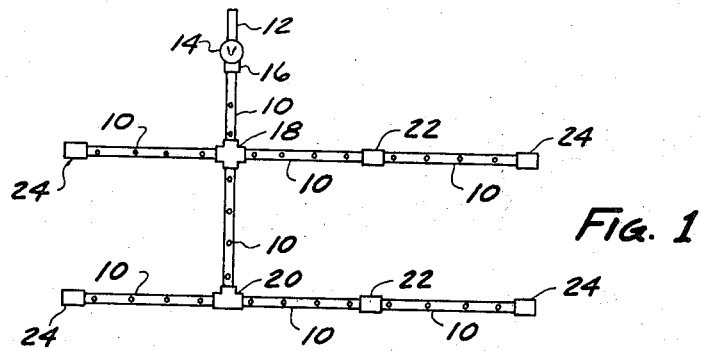
FIG. 1
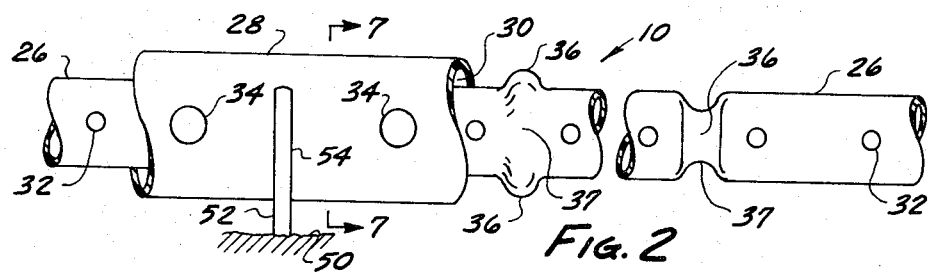
FIG. 2
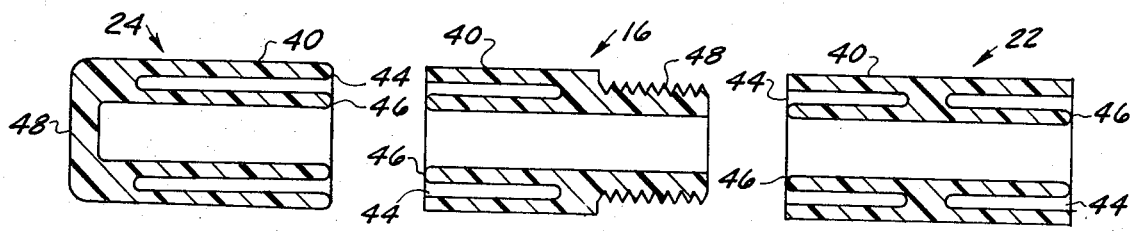
FIG. 3     FIG. 4     FIG. 5
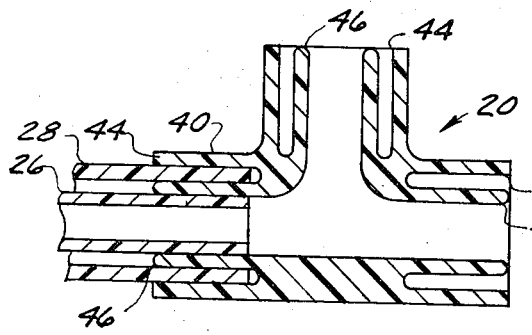
FIG. 6
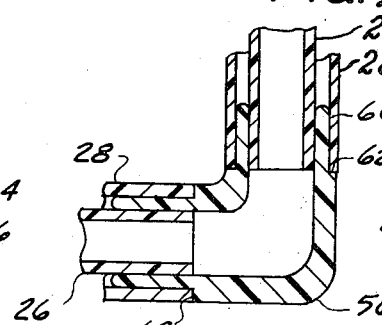
FIG. 9
FIG. 8
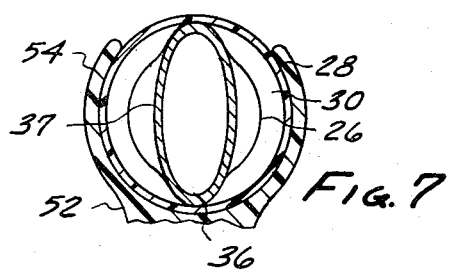
FIG. 7
INVENTOR.
GORDON L. EBBE.
BY Angus & Mon
ATTORNEYS.

United States Patent Office 3,540,223
Patented Nov. 17, 1970

3,540,223
IRRIGATION SYSTEMS AND CONNECTORS THEREFOR
Gordon L. Ebbe, 326 N. Ivy, Monrovia, Calif. 91016
Filed Jan. 10, 1968, Ser. No. 696,763
Int. Cl. E02b 13/00; F16l 39/00
U.S. Cl. 61—12                                10 Claims

ABSTRACT OF THE DISCLOSURE

An irrigation system according to the present disclosure includes a pair of substantially concentric conduits forming a cavity therebetween. The inner conduit is connected to a supply of water under pressure. A plurality of metered apertures is provided through each conduit in such a manner as to reduce the pressure of water flowing through the apertures in the outer conduit.

A coupler according to the present disclosure is adapted to be connected to a pair of substantially concentric conduits and provides fluid communication to only the inner conduit.

---

This invention relates to irrigation systems, and to connectors therefor. Irrigation systems according to the present invention are particularly suitable for permanent installation.

It is desirable, when irrigating plants and shrubs, to make certain that the flow of water does not erode the soil around the plant. Heretofore, irrigation systems for irrigating tracts of land were either of two types. One type of irrigation system included conduits placed on the soil connected to a supply of water under pressure, such as an ordinary household water supply system. Apertures were provided through the conduits, which apertures were of such size as to maintain sufficient pressure within the conduits to ensure that water would flow from all of the apertures. One problem with this type of irrigation was that the velocity of the water flowing through the apertures caused soil erosion.

To overcome the erosion problem associated with the first type of irrigators, a second type of irrigator was developed, known as "soakers." In essence, a soaker was a device constructed of thin, porous plastic or canvas and adapted to permit water to diffuse through its walls to irrigate the soil. Flow from these devices is too slow for many practical irrigation applications. Furthermore, due to their construction, soakers tended to deteriorate when exposed to the atmosphere for substantial lengths of time, and would burst. Their replacement cost makes them uneconomical for many uses.

It is an object of the present invention to provide an irrigation system capable of discharging water at a maximum volumetric rate, and favorable velocities, so as to irrigate an area in a practical length of time with little or no erosion.

Another object of the present invention is to provide an irrigation system which is capable of withstanding abuse and deterioration in use.

An irrigation system according to the present invention comprises a pair of conduits one inside the other. In the preferred embodiment they are concentric. The inner conduit is adapted to be connected to a supply of water under pressure. A plurality of metered apertures is provided through each conduit, which apertures are of such size and relative number that the velocity of water flowing through the apertures in the outer conduit is lower than the velocity of water flowing through the apertures in the inner conduit.

According to an optional but desirable feature of the present invention, the apertures in each conduit are metered so that the total area of the apertures provided through the outer conduit is greater than the total area of the apertures provided through the inner conduit.

Another object of the present invention is to provide couplers for connecting and maintaining in substantially concentric relation, conduits for use in an irrigation system.

A coupler according to the present invention is adapted to be connected to a pair of substantially concentric conduits and provides fluid communication to only the inner conduit.

The above and other features of the present invention will be more fully understood from the following detailed description and the accompanying drawings, in which:

FIG. 1 is a top view of a typical irrigation system in accordance with the presently preferred embodiment of the present invention;

FIG. 2 is a partly-cutaway side view elevation of a pair of substantially concentric conduits for use in an irrigation system according to the present invention;

FIGS. 3–5 are side view elevations in cutaway cross-section of various couplers for use with the conduits illustrated in FIG. 2;

FIG. 6 is a side view elevation in cutaway cross-section of another coupler assembled to the conduits illustrated in FIG. 2;

FIG. 7 is a cutaway section taken at line 7—7 in FIG. 2;

FIG. 8 is a side view elevation in cutaway cross-section of a modification of a coupler for use with the conduits illustrated in FIG. 2; and FIG. 9 is a side view elevation in cutaway cross-section of another coupler assembled to the conduits illustrated in FIG. 2.

Referring now to the drawings, there is illustrated in FIG. 1 the presently preferred embodiment of an irrigation system adapted to be permanently installed upon the surface of the soil to be irrigated. The irrigation system comprises a plurality of conduits 10 connected to a supply of water 12 through valve 14. Supply 12 may be any suitable supply of water such as an ordinary household water supply. Adapter coupler 16 connects one conduit 10 to valve 14. Couplers 18 and 20 provide cross and T connections to various conduits 10. Couplers 22 provide coupling between successive conduits 10. Couplers 24 are caps or plugs which close the ends of the end conduit 10 of each branch of the irrigation system. The conduits and couplers are preferably constructed of hard plastic, such as polyvinyl chloride, and the couplers are preferably interference fitted to conduits 10 in order to connect them. Alternatively, the couplers may be bonded to the conduits by means of a suitable resin, such as an epoxy resin. It is to be understood that the number and type of couplers utilized will vary in accordance with the design of the system, and that other types of couplers than those illustrated in the drawings may be utilized, such as 90° elbows, 45° elbows, and others.

FIG. 2 illustrates the presently preferred embodiment of a conduit 10 for use in the irrigation system illustrated in FIG. 1. Conduit 10 comprises inner tube 26 and outer tube 28 concentrically arranged to form cavity 30 between them. A plurality of metered apertures 32 is provided in spaced relation along the length of inner conduit 26 and a plurality of metered apertures 34 is provided in spaced relation along the length of outer conduit 28. The relationship of apertures 32 and 34 is preferably such that the total area provided by apertures 34 in outer conduit 28 is larger than the total area of apertures 32 through conduit 26. Preferably, the apertures through the inner and outer conduits are arranged and disposed so that they do not face one another. A convenient means for this type of arrangement is to provide apertures through only one radial portion of each conduit and to arrange the conduits so that the apertures in the inner conduit are 180° from the apertures in the outer conduit.

One practical device according to the present invention utilizes ½ inch inside diameter plastic pipe for inner conduit 26 and one inch inside diameter plastic pipe for outer conduit 28. Apertures 32 are spaced six inches apart and have a diameter of ⅛ inch, and apertures 34 are spaced twelve inches apart and have a diameter of ¼ inch. The area of each ⅛ inch aperture is ¼ the area of each ¼ inch aperture, so the provision of a single ¼ inch hole through outer conduit 28 for each two ⅛ inch apertures through inner conduit 26 provides apertures of twice the total effective area through the outer conduit than that which is provided through the inner conduit.

As shown particularly in FIG. 7, inner conduit 26 is crimped at various locations along its length so as to provide bulges 36 and depressions 37. The peaks of bulges 36 extend from the nominal surface of conduit 26 and contact the inside of outer conduit 28, thereby maintaining the conduits substantially concentric. Depressions 37 permit fluid communication between opposite sides of each crimp.

The conduits are preferably spaced from the ground 50 by means of holders 52. Holders 52 are preferably constructed of resilient plastic so that arms 54 may be spread apart to fit around the conduit. Holders 52 are attached to the conduit 28 at intervals along its length to hold conduit 28 above the ground. By way of example, holder 52 may be a spike adapted to be embedded in the ground to hold conduit 28 about ¼ inch above the surface of the ground. Holders 52 may be spaced approximately every sixty inches along the length of the conduit 28.

FIGS. 3–6 illustrate useful couplers for connecting a water supply to the concentric conduits. Each coupler includes a body 40 with an outer lip 44 and an inner lip 46. As shown in FIG. 6, each coupler is connected to an end of each conduit of a pair of conduits so that the end of an outer conduit 28 is held between lips 44 and 46, and the end of an inner conduit 26 is held within lip 46. Lips 44 and 46 form an interference fit over conduits 26 and 28, thereby providing a fluid seal between each conduit and the respective coupler. If desired, the couplers and conduits may be held together with a suitable bonding agent, such as an epoxy resin. It is to be understood however, that the conduits and couplers may be constructed of material other than plastic, and that seals may be used if desired.

FIG. 3 illustrates a cap or plug 24 having a barrier wall 48 for closing fluid communication of the end of a pair of concentric conduits. FIG. 4 illustrates an adapter coupler 16 for connecting a pair of concentric conduits to a supply of water. Coupler 16 includes a threaded portion 48 for connecting the coupler to a source of water under pressure. FIG. 5 illustrates a coupler 22 for coupling one pair of concentric conduits to another pair of concentric pipes. FIG. 6 illustrates a T coupling 20 for connecting three pairs of concentric conduits together. The couplers provide fluid communication between the inner conduits while the inner lip closes communication between outer conduits. The couplers illustrated in FIGS. 3–6 also aid in maintaining the conduits substantially concentric.

FIGS. 8 and 9 illustrate another form of a coupler useful with conduits 26 and 28 in FIG. 2. Couplers 56 and 58 include lips 60 adapted to fit over conduit 26 and having an outside diameter permitting conduit 28 to be fitted over the lip. Shoulder 62 is provided to abut the end of each outer conduit. The advantage of the couplers illustrated in FIGS. 8 and 9 is that when the system is assembled, the couplers and conduits will appear to have a substantially smooth surface, thereby providing an irrigation system which will not detract from the asthetic appearance of the garden being irrigated.

In operation of the irrigation system in accordance with the present invention, conduits 10 are arranged in any suitable pattern and are interconnected with the couplers illustrated in FIGS. 3–7. The irrigation system is connected through valve 14 to a source of water under pressure at conduit 12. When water under pressure is delivered to the irrigation system, the water flows radially through apertures 32, into the cavity 30 between the two conduits and radially through apertures 34. Since the area associated with apertures 34 is larger than the area associated with apertures 32, the water pressure in cavity 30 is less than the pressure of the supply, and the velocity of water flowing through apertures 34 is less than the velocity of water flowing through apertures 32.

The number of conduits 10 associated with the irrigation system may be varied in accordance with particular design requirements of the tract being irrigated, and is limited only by the water pressure available through conduit 12. Likewise, the number, sizing and spacing of apertures 32 and 34 provided through associated conduits 26 and 28 may be varied in accordance with any particular design requirement, the only limitation being that the total effective area provided by aperatures 34 through the outer conduit be substantially larger than the total effective area of apertures 32.

The present invention thus provides an irrigation system for irrigating soil without adverse erosion. The system and its component parts is easily constructed and manufactured, and may be sold at a substantial reduction in price over what was previously available. The system and its component parts is easily fabricated. The system is easily assembled and installed, and requires only minimal maintenance.

This invention is not to be limited by the embodiments shown in the drawings or described in the description, which are given by way of example and not of limitation, but only in accordance with the scope of the appended claims.

What is claimed is:

1. An irrigation system comprising: a first and a second conduit means, said first conduit means being disposed within said second conduit means, said first and second conduit means forming a cavity inside of said second conduit means and outside of said first conduit means; a first plurality of metered apertures disposed in spaced relation through a wall of said first conduit means along its length in fluid communication with said cavity; a second plurality of metered apertures disposed in spaced relation through a wall of said second conduit means along its length in fluid communication with said cavity, the combined area of said second plurality of metered apertures being greater than the combined area of said first plurality of metered apertures; and first coupler means for connecting said first conduit means to a supply of water under pressure, said first coupler means comprising a first and a second attachment means, an end of said first conduit means being attached to said first attachment means, an end of said second conduit means being attached to said second attachment means, passage means through said first coupler means providing fluid communication between the interior of said first conduit means and the supply of water under pressure, and means forming a barrier on said first coupler means between said first and second attachment means.

2. An irrigation system according to claim 1 wherein said first conduit means is disposed within said second conduit means for substantially the full length of the second conduit means.

3. An irrigation system according to claim 1 further including spacer means supported by said first conduit means for maintaining said first and second conduit means in spaced relation.

4. An irrigation system according to claim 3 wherein said first conduit means is a crimpable tube and said spacer means comprises a plurality of crimps in said crimpable tube disposed in spaced relation along the length of the tube, each crimp forming a pair of oppositely disposed bulges, the distance between the peaks of the oppositely disposed bulges being substantially the same as the inner diameter of said second conduit means.

5. An irrigation system according to claim 1 wherein said first conduit means comprises first and second tubes and said second conduit means comprises third and fourth tubes, said first tube being disposed in said third tube and said second tube being disposed in said fourth tube, and second coupler means attached to an end of each of said first, second, third and fourth tubes, said second coupler means providing fluid communication between said first and second tubes, said second coupler means further including barrier means closing fluid communication between said third and fourth tubes.

6. An irrigation system according to claim 1 further including holder means attached to the second conduit means for holding the second conduit means above the surface of the ground to be irrigated.

7. An irrigation system comprising: first, second, third and fourth tubes, said first tube being disposed in said third tube and said second tube being disposed in said fourth tube, said first and third tubes forming a first cavity inside of said third tube and outside of said first tube and said second and fourth tubes forming a second cavity inside of said fourth tube and outside of said second tube; a first plurality of metered apertures disposed in spaced relation through a wall of said first tube along its length in fluid communication with said first cavity; a second plurality of metered apertures disposed in spaced relation through a wall of said second tube along its length in fluid communication with said second cavity; a third plurality of metered apertures disposed in spaced relation through a wall of said third tube along its length in fluid communication with said first cavity; a fourth plurality of metered apertures disposed in spaced relation through a wall of said fourth tube along its length in fluid communication with said second cavity, the combined area of said third plurality of metered apertures being greater than the combined area of said first plurality of metered apertures and the combined area of said fourth plurality of metered apertures being greater than the combined area of said second plurality of metered apertures; first coupler means for connecting said first tube to a supply of water under pressure; and second coupler means attached to an end of each of said first, second, third and fourth tubes, said second coupler means providing fluid communication between said first and second tubes, said second coupler means further including barrier means closing fluid communication between said third and fourth tubes.

8. An irrigation system according to claim 7 further including spacer means supported by said first and second tubes for maintaining said first and third tubes in spaced relation and for maintaining said second and fourth tubes in spaced relation.

9. An irrigation system according to claim 8 wherein said first and second tubes are crimpable tubes and said spacer means comprises a plurality of crimps in said crimpable tubes disposed in spaced relation along the lengths of said first and second tubes, each crimp forming a pair of oppositely disposed bulges, the distance between the peaks of the oppositely disposed bulges being substantially the same as the inner diameter of the respective third and fourth tubes.

10. An irrigation system according to claim 7 further including holder means attached to said third and fourth tubes for holding the third and fourth tubes above the surface of the ground to be irrigated.

References Cited

UNITED STATES PATENTS

| | | | |
|---|---|---|---|
| 346,920 | 8/1886 | Jessup | 61—12 |
| 2,475,635 | 7/1949 | Parsons | 138—148 X |
| 2,763,991 | 9/1956 | Kennon | 61—13 |
| 2,937,662 | 5/1960 | Green | 138—148 X |
| 2,959,196 | 11/1960 | Truesdell et al. | 138—148 |
| 3,133,753 | 5/1964 | Goodman et al. | 285—331 X |
| 3,426,544 | 2/1969 | Curtis | 61—13 |
| 3,403,519 | 10/1968 | Balko | 61—13 |

JACOB SHAPIRO, Primary Examiner

U.S. Cl. X.R.

138—89, 148; 285—5, 156, 179